United States Patent
Medower et al.

(10) Patent No.: US 8,685,621 B2
(45) Date of Patent: *Apr. 1, 2014

(54) FIRST-SIDE DUAL-LAYER OPTICAL DATA STORAGE DISK AND METHOD OF MANUFACTURING THE SAME

(75) Inventors: Brian Medower, Boulder, CO (US); Ian Redmond, Fife (GB); David Davies, Boulder, CO (US)

(73) Assignee: Enhanced Data Solutions, LLC, Longmont, CO (US)

( * ) Notice: Subject to any disclaimer, the term of this patent is extended or adjusted under 35 U.S.C. 154(b) by 356 days.

This patent is subject to a terminal disclaimer.

(21) Appl. No.: 12/116,161

(22) Filed: May 6, 2008

(65) Prior Publication Data

US 2008/0247295 A1  Oct. 9, 2008

Related U.S. Application Data

(63) Continuation of application No. 09/854,333, filed on May 11, 2001, now Pat. No. 7,368,222, which is a continuation-in-part of application No. 09/764,042, filed on Jan. 16, 2001, now abandoned.

(51) Int. Cl.
```
G11B 7/24      (2006.01)
G11B 7/254     (2013.01)
G11B 7/0045    (2006.01)
G11B 7/243     (2013.01)
G11B 7/257     (2013.01)
```

(52) U.S. Cl.
CPC .......... *G11B 7/254* (2013.01); *G11B 7/00452* (2013.01); *G11B 2007/2431* (2013.01); *G11B 2007/24312* (2013.01); *G11B 2007/24314* (2013.01); *G11B 2007/25408* (2013.01); *G11B 2007/25713* (2013.01); *G11B 2007/25715* (2013.01); *G11B 2220/216* (2013.01)

USPC ............... 430/270.13; 369/284; 369/275.2; 369/275.5

(58) Field of Classification Search
None
See application file for complete search history.

(56) References Cited

U.S. PATENT DOCUMENTS

| | | | | |
|---|---|---|---|---|
| 4,374,077 A | * | 2/1983 | Kerfeld | 264/1.33 |
| 4,450,553 A | * | 5/1984 | Holster et al. | 369/275.5 |
| 4,960,680 A | * | 10/1990 | Pan et al. | 430/270.13 |
| 5,406,544 A | * | 4/1995 | Clark et al. | 369/275.3 |
| 5,764,619 A | * | 6/1998 | Nishiuchi et al. | 369/275.1 |
| 5,783,360 A | * | 7/1998 | Phillips et al. | 430/270.12 |
| 6,108,297 A | * | 8/2000 | Ohta et al. | 369/275.4 |
| 6,154,440 A | * | 11/2000 | Ichihara | 369/275.4 |
| 6,208,736 B1 | * | 3/2001 | Gotoh et al. | 380/203 |
| 6,210,609 B1 | * | 4/2001 | Takeda et al. | 264/1.33 |
| 6,346,309 B1 | * | 2/2002 | Daimon | 428/64.1 |
| 6,511,788 B1 | * | 1/2003 | Yasuda et al. | 430/270.13 |
| 6,908,725 B2 | * | 6/2005 | Blankenbeckler et al. | 430/270.13 |
| 7,368,222 B2 | * | 5/2008 | Medower et al. | 430/270.13 |
| 7,554,898 B2 | * | 6/2009 | Blankenbeckler et al. | 369/275.3 |

FOREIGN PATENT DOCUMENTS

| | | | |
|---|---|---|---|
| EP | 945860 | * | 9/1999 |
| JP | 03-086943 | * | 4/1991 |
| JP | 07-225971 | * | 8/1995 |
| JP | 2000-293901 | * | 10/2000 |
| WO | 84/02419 | * | 6/1984 |
| WO | 99/45539 | * | 9/1999 |

* cited by examiner

*Primary Examiner* — Martin Angebranndt
(74) *Attorney, Agent, or Firm* — Law Office of Gerald Maliszewski; Gerald Maliszewski

(57) ABSTRACT

An optical data storage disk includes a central substrate and on each side of the substrate a pair of metal/alloy recording layers separated by a transparent layer.

3 Claims, 8 Drawing Sheets

FIRST-SIDE DUAL-LAYER OPTICAL DATA STORAGE DISK AND METHOD OF MANUFACTURING THE SAME

CROSS-REFERENCE TO RELATED APPLICATIONS

This application is a continuation of application Ser. No. 09/854,333, filed. May 11, 2001, and issued as U.S. Pat. No. 7,368,222, which, is a continuation-in-part of application Ser. No. 09/764,042, filed. Jan. 16, 2001, now abandoned, which is incorporated herein by reference.

BACKGROUND

Optical data storage media often take form in a data-carrying layer formed on a disk shaped polycarbonate substrate. These devices typically fall in the category of substrate-incident media since data recorded in the data-carrying layer is retrieved by illuminating the data-carrying layer through the substrate. More particularly, illumination light for reading the data first passes through the substrate before being received by the data-carrying layer surface.

Optical data storage media take form in one of three distinct embodiments: read-only optical data storage media, write-once optical data storage media, or rewritable optical data storage media. In read-only optical data storage media, data is recorded in the data-carrying layer as a series of physical marks or bumps. These physical marks or bumps are typically formed using an injection-molded process. Once formed the physical marks or bumps cannot be erased or overwritten. The physical marks or bumps have different diffractive properties when compared to areas of the read-only data-carrying layer that lack physical marks or bumps. Data retrieval in read-only optical data storage media is facilitated by the difference in diffractive properties.

Write-once optical data storage media commonly take form in a polycarbonate substrate spin coated with a layer of organic dye. Data is recorded by illuminating the organic dye layer through the substrate with a light beam whose intensity is modulated in accordance with data to be recorded. Select areas of the organic dye subjected to high intensity light chemically change and result in "dark" areas, i.e., areas which have a lower light reflectivity when compared to areas of the organic dye which are not subjected to high intensity light. To achieve compatibility with read-only optical data storage media, data is recorded as a sequence of low reflectivity dark regions each one of which is positioned between spaces of high reflectivity. This difference in reflectivity facilitates data retrieval. The chemical change in the organic dye is irreversible. Thus, data written to the organic dye layer cannot be overwritten.

Unlike read-only or write-once optical data storage media, data recorded in the data-carrying layer of rewritable optical data storage media can be erased and replaced with new data. The data-carrying layer of rewritable optical data storage media may take form in a phase-change material. The phase-change material is capable of phase change between amorphous and crystalline states. Initially, the phase-change material is formed on the polycarbonate substrate in an amorphous state. Thereafter, the state of the entire phase-change layer is changed to the crystalline state by illuminating the phase-change layer through the substrate with a high intensity light. Data is recorded in rewritable optical data storage media by illuminating the phase-change layer through the substrate with a light beam modulated in accordance with data to be recorded. The modulated light beam causes select areas of the phase-change layer to change from crystalline to amorphous. Crystalline regions have higher light reflectivity when compared to amorphous regions. In rewritable optical data storage media, data is recorded as a sequence of low reflectivity amorphous regions each one of which is positioned between crystalline spaces of high reflectivity. This difference in reflectivity facilitates data retrieval. Recorded data may be erased by illuminating the entire phase-change layer, or sub-regions thereof, through the substrate with a high intensity light. The high intensity light changes the amorphous areas back to the crystalline state.

SUMMARY

Disclosed is an optical data storage media. The optical data storage media includes a substrate having oppositely facing first and second surfaces. A first metal/alloy layer is formed overlaying the first surface of the substrate. The first metal/alloy layer is formed from tin, antimony and element selected from the group consisting of indium, germanium, aluminum, and zinc. After the first metal/alloy layer is formed, a first dielectric layer is formed overlaying the first metal/alloy layer. This dielectric layer is formed from silicon oxynitride. The first metal/alloy layer is positioned between the substrate and the first dielectric layer.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

Figure 1:
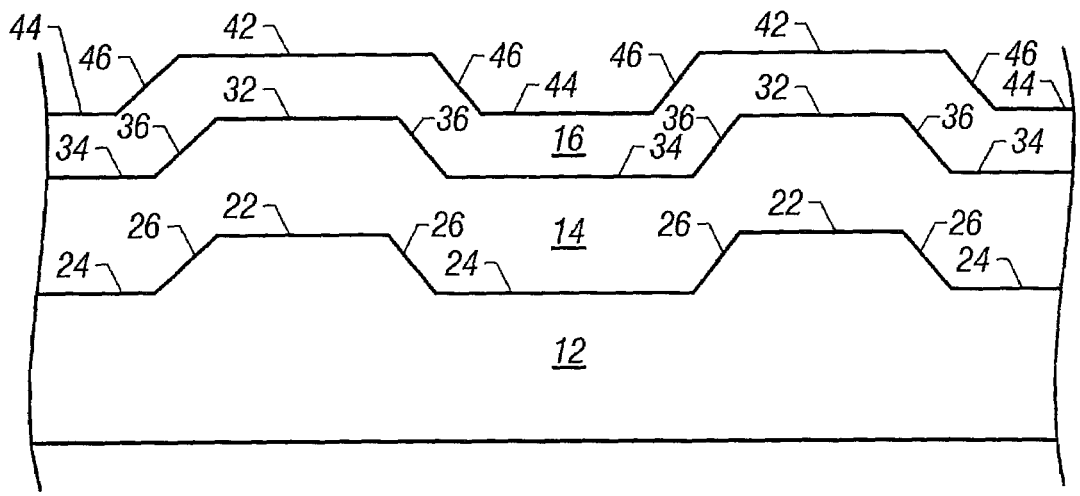
FIG. 1 is a cross-sectional view of a single-sided optical data storage disk employing the present invention.

While the invention is susceptible to various modifications and alternative forms, specific embodiments thereof are shown by way of example in the drawings and will herein be described in detail; however, it should be understood that the drawings and detailed description thereto are not intended to limit the invention to the particular form disclosed. On the contrary, the intention is to cover all modifications, equivalents, and alternatives falling within the spirit and scope of the present invention as defined by the appended claims.

DETAILED DESCRIPTION

FIG. 1 shows a cross-sectional view of an optical data storage media in the form of disk 10 employing the present invention. The optical data storage disk 10 includes a substrate 12 with thin layers of phase-change metal/alloy 14 and dielectric 16 formed thereon. The phase-change metal/alloy layer 14 is positioned between dielectric layer 16 and substrate 12.

A surface of substrate 12 is grooved such that it is defined by raised surface portions 22, recessed surface portions 24, and side walls 26. The cross-sectional shape of phase-change metal/alloy 14 and dielectric layer 16 mimics the grooved surface of substrate 12. Thus, phase-change layer 14 includes an upper surface defined by raised surface portions 32, recessed surface portions 34, and side walls 36, and dielectric layer 16 includes an upper surface defined by raised surface portions 42, recessed surface portions 44, and side walls 46. Raised surface portions 42 and recessed surface portions 44 are often referred to as lands 42 and grooves 44.

Figure 2:
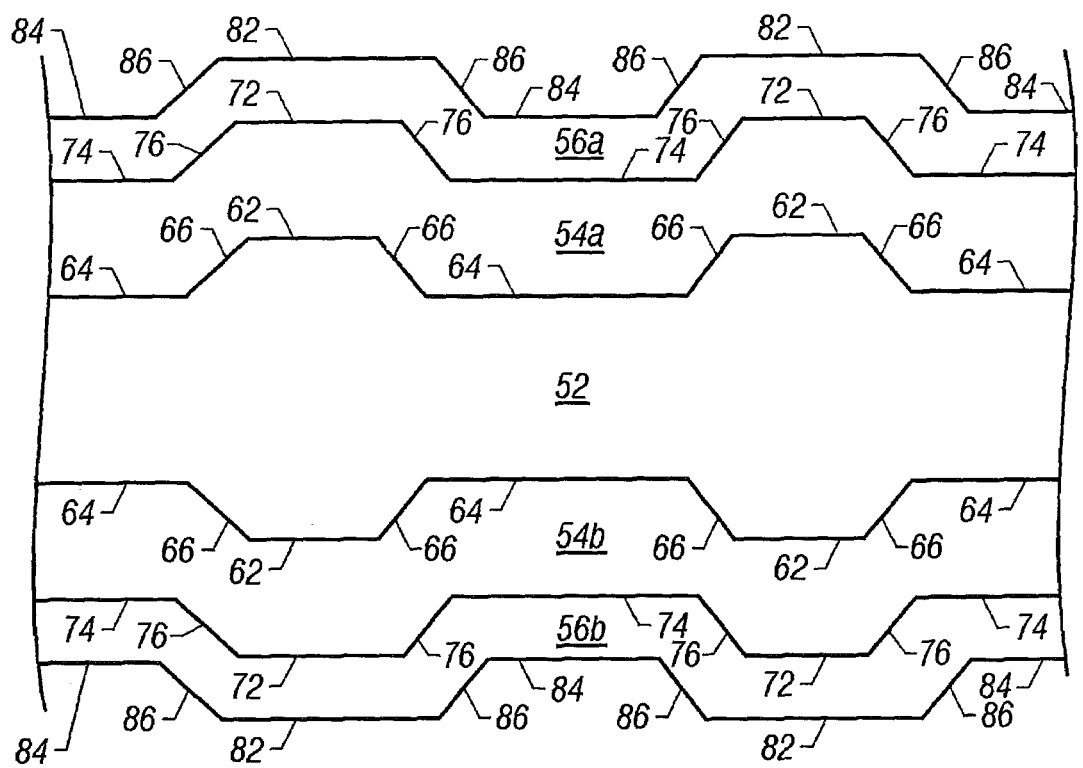
FIG. 2 is a cross-sectional view of a double-sided optical data storage disk employing the present invention.

FIG. 1 illustrates an exemplary single-sided optical data storage disk 10. FIG. 2 shows a cross-sectional view of a two-sided optical data storage disk 50 employing the present invention. With continued reference to FIG. 2, optical data storage disk 50 includes a substrate 52, a pair of phase-change metal/alloy layers 54a and 54b, and a pair of dielectric layers 56a and 56b. The phase-change layers 54a and 54b are formed on oppositely-facing top and bottom surfaces of substrate 52, respectively. Dielectric layers 56a and 56b are formed on phase-change metal/alloy layers 54a and 54b, respectively, such that the phase-change metal/alloy layers 54a and 54b are positioned between dielectric layers 56a and 56b, respectively, and substrate 52.

The oppositely-facing top and bottom surfaces of substrate 52 are grooved such that the top and bottom surfaces of substrate 52 are defined by raised surface portions 62, recessed surface portions 64, and side walls 66. The cross-sectional shape of phase-change layers 54a-54b and dielectric layers 56a-56b mimic the grooved surfaces of substrate 52. Thus, the top and bottom surfaces of phase-change layers 54a and 54b, respectively, are defined by raised surface portions 72, recessed surface portions 74, and side walls 76. The top and bottom surfaces of dielectric layers 56a and 56b, respectively, are defined by raised surface portions 82, recessed surface portions 84, and side walls 86.

Substrates 12 or 52 may be formed from a polycarbonate material. Phase-change metal/alloy layers 14, 54a, or 54b are preferably formed from the tin, antimony, and indium metal/alloy described in U.S. Pat. No. 5,271,978 entitled "Optical Recording Media," filed Jan. 31, 1992, and incorporated herein by reference in its entirety. In the alternative, phase-change metal/alloy layers 14, 54a, or 54b may be formed from other materials including but not limited to: tin, antimony, and germanium; tin, antimony, and aluminum; and; tin, antimony, and zinc.

The phase-change metal/alloy layer 14, 54a, or 54b is initially deposited on the substrate 12 or 52 in an amorphous state. Thereafter, as will be more fully described below, during data storage, the substrate 12 or 52 is rotated and the phase-change metal/alloy layer 14, 54a, or 54b is illuminated with a writing light beam that is modulated in accordance with a stream of data signals. For descriptive purposes, the light beam for writing or reading data to the phase-change metal/alloy layer 14, 54a, or 54b will be presumed to have a wavelength of approximately 650 nm unless otherwise noted, it being understood that other light beam wavelengths are contemplated including wavelengths of 630-670 nm or 380-420 nm. The light beam crystallizes selective spots of the phase-change metal/alloy 14, 54a, or 54b to produce an optical data pattern of crystalline spots surrounded by amorphous regions. Data is recorded as a sequence of high reflectivity crystalline spots or regions each one of which is positioned between amorphous spaces of relatively low reflectivity. The resulting optical data pattern corresponds to the stream of data signals.

Data stored on the phase-change layer 14, 54a, or 54b of the optical data storage device can be read by illuminating the optical data pattern with a reading light beam, and subsequently detecting the light reflected therefrom. The reflected light is modulated in accordance with the reflectivity of the optical data pattern. Light detectors receive the reflected light and generate data signals that represent the optical data pattern.

Phase-change metal/alloy layer 14, 54a, or 54b is characterized by having good writing sensitivity and good signal-to-noise ratio. The signal-to-noise ratio depends on a number of factors including, but not limited to, the difference in reflectivity between adjacent amorphous and crystalline regions.

Optical data storage devices with a tin, antimony, and indium phase-change layer overcoated with a dielectric layer of $SiO_x$ (where x is between 1 and 2) have been made and tested. During formation of the dielectric layer, oxygen in the $SiO_x$ interacts with the SbSnIn to create a thin layer of native oxide having a substantially uniform cross-section. With the native oxide layer, the phase-change layer is substantially corrosion protected. Unfortunately, the use of $SiO_x$ to form the dielectric layer on the SbSnIn metal/alloy often results in an optical structure having substantially non-uniform optical characteristics. More particularly, the use of $SiO_x$ may result in a dielectric layer having a real part of refractive index that varies unacceptably within an optical storage disks or between optical data storage disks. Unless otherwise noted, the following description presumes a light beam of approximately 650 nm.

Returning to FIGS. 1 and 2, dielectric layers 16, 56a, or 56b may be formed from silicon oxynitride ($SiO_xN_y$) instead of $SiO_x$. It is noted that x in $SiO_xN_y$ and $SiO_x$ need not be the same number. During formation of a silicon oxynitride dielectric layer on phase-change layers 14, 54a, or 54b, the oxygen content of the silicon oxynitride material interacts with the phase-change metal/alloy layer and forms a thin and substantially uniform native oxide layer therebetween. The oxide layer maintains the functional and structural characteristics of underlying phase-change layer during subsequent use of the optical data storage disk.

Figure 5A:
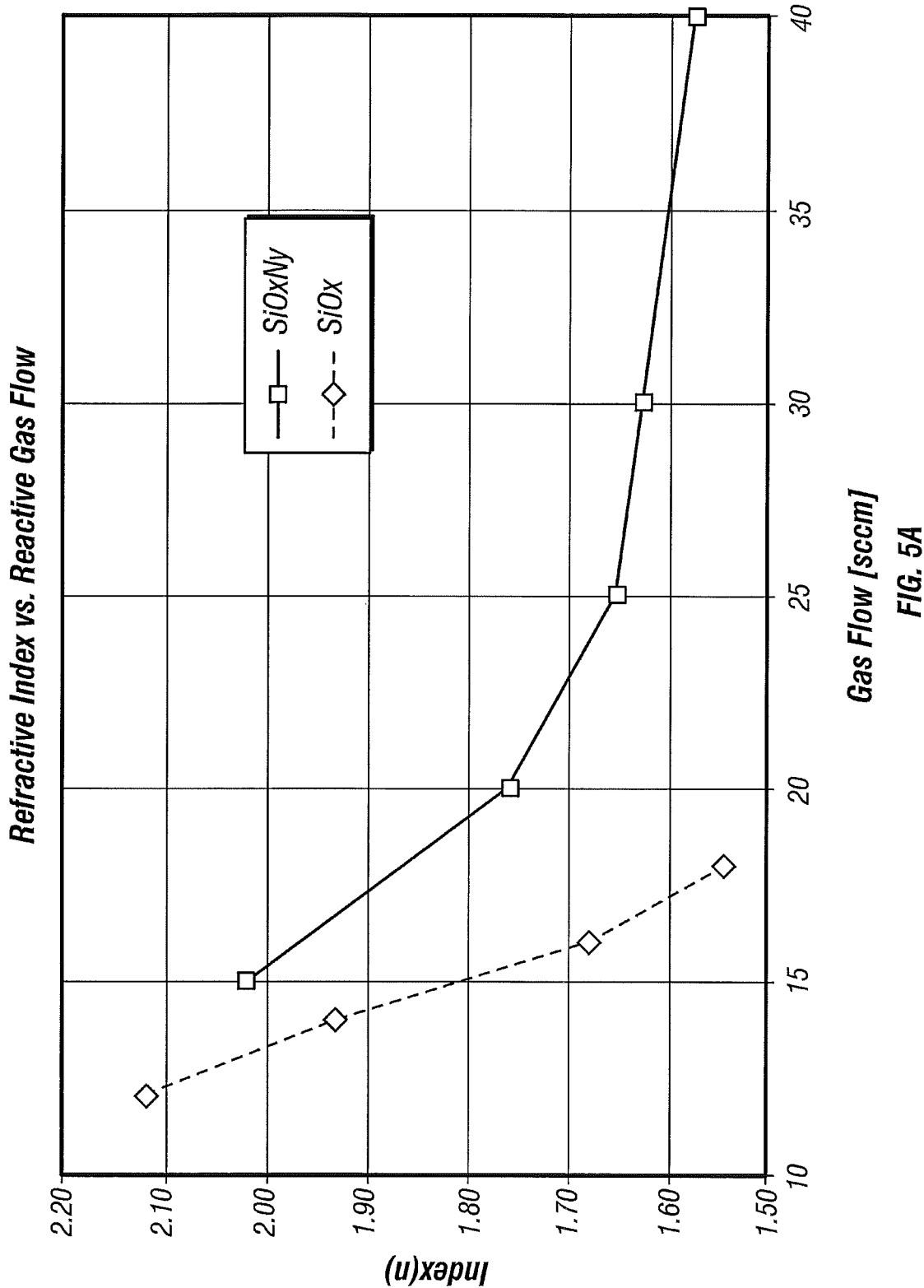
FIG. 5a illustrates how the real part n of the refractive indexes for $SiO_xN_y$ and $SiO_x$ dielectric varies as the gas flow varies during reactive sputtering formation of the $SiO_xN_y$ and $SiO_x$ dielectric layers.
Figure 5B:
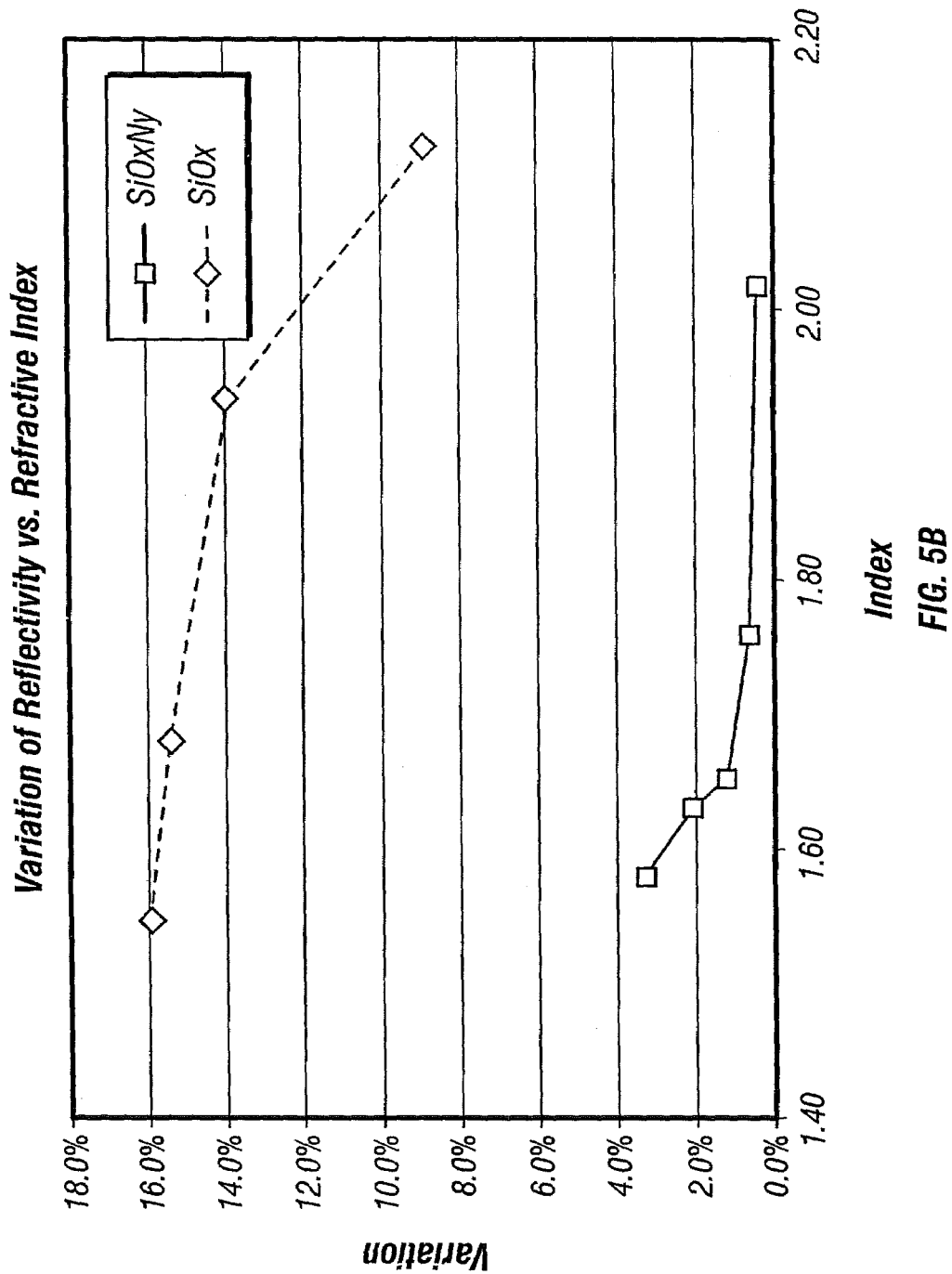
FIG. 5b illustrates how the reflectivity varies in $SiO_x$ and $SiO_xN_y$ dielectric layers as the real part n of the refractive index varies for the $SiO_x$ and $SiO_xN_y$ dielectric layers.

The silicon oxynitride dielectric may be formed on the phase-change layer using any one of a number of techniques. In a preferred embodiment, the silicon oxynitride layer is formed on the phase-change layer using a reactive gas sputtering process. The use of $SiO_xN_y$ as the dielectric has resulted in an unexpected benefit of refractive index uniformity. FIG. 5a plots n, the real part of the refractive index, of the silicon oxynitride dielectric layer as a function of the reactive gas flow during the reactive gas sputtering process to form the dielectric layer. FIG. 5a also plots n of a $SiO_x$ dielectric layer as a function of the reactive gas flow in the reactive gas sputtering process. A comparison of the plots shows that the change in n is greater in the $SiO_x$ dielectric for a given change in gas flow. FIGS. 5a-7 illustrate data collected using a light beam with a wavelength 650 nm. FIG. 5b plots the refractive indexes as a function of n for the SiO$_x$ and silicon oxynitride dielectric layers. It can be seen from FIG. 5b that, for a given range, a change in n results in a larger change in the refractive index in the SiO$_x$ dielectric.

During the reactive sputtering process, gas flow may vary. Gas flow variations lead to variations in the properties (e.g. refractive index, thickness, density) of the reactively sputtered films. Variations in refractive index or thickness are particularly problematic for films used for optical data storage. Since the contrast of the written data signal is enhanced by means of an interference structure, the contrast is primarily a function of the optical thickness of the layers in the film stack. (Optical thickness is defined as refractive index multiplied by physical thickness.) For the two layer film stack outlined in this description, the contrast is controlled in part by the optical thickness of the silicon oxynitride. Variations of more than a few percent in the thickness or refractive index of the silicon oxynitride layer lead directly to variations in the quality of the data signals. This is undesirable from the standpoint of playback, as the drive requires uniform signals for optimal performance. However, as shown in FIGS. 5a and 5b, the adverse effects of gas flow variation will be less in the resulting silicon oxynitride dielectric layer when compared to the SiO$_x$ dielectric layer.

FIGS. 1 and 2 illustrate examples of optical data storage disks having a single layer of phase-change metal/alloy formed on one or both sides of a polycarbonate substrate. These optical data storage disks are examples of single-layer optical data storage disks. The present invention should not be limited thereto. The present invention may find application in dual-layer optical data storage disks such as those described in application Ser. No. 09/764,042 entitled "First-Side Dual-Layer Optical Data Storage Disk And Method Of Manufacturing The Same."

FIGS. 1 and 2 illustrate examples of first-surface optical data storage disks. With first-surface optical data storage disks, data is written to or read from the phase-change metal/alloy layer by a focused light beam that first passes through the dielectric layer (e.g., 56a or 56b) and then writes to or reads from the phase-change metal/alloy layer (e.g., 54a or 54b) without first passing through the substrate. First-surface optical data storage disks are used in systems where the dielectric layer lies between the writing/reading laser and the phase-change metal/alloy layer of the substrate. In contrast, the phase-change metal/alloy layer of a substrate-incident, optical data storage disk is written to or read from by a focused light beam that first passes through the substrate and then writes to or reads from the phase-change metal/alloy layer. Substrate-incident, optical data storage disks are used in systems where the substrate is positioned between the writing/reading laser and the phase-change metal/alloy layer of the substrate. Application Ser. No. 09/652,975 entitled "First-Side Dual-Layer Optical Data Storage Disk And Method Of Manufacturing The Same" filed Aug. 31, 2000, illustrates examples of first and substrate-incident optical data storage disks and is incorporated herein by reference. The present invention may find application to substrate-incident optical data storage disks and should not be limited to use in first-surface optical data storage disks.

FIGS. 1 and 2 illustrate examples of optical data storage disks comprising rigid polycarbonate substrates with grooved surfaces. The present invention should not be limited thereto. The present invention may find application to optical data storage media containing flexible substrates. Further, the present invention may find application in optical data storage media having a substrate with no grooves formed thereon. In such a non-grooved substrate, the phase-change metal/alloy layer and/or dielectric layer may have a substantially uniform and flat cross-sectional shape.

Substrate 12 of FIG. 1 may be created during an injection molding process in which molten polycarbonate is injected into a mold cavity that includes a metal stamper. The metal stamper has a grooved surface that mirrors the grooves of substrate 12. Pressure is applied to the mold cavity so that the molten polycarbonate flows into the grooves of the metal stamper. After solidification, the substrate is removed from the mold cavity and the grooved surface is subsequently sputter coated with the thin layers of phase-change metal/alloy and dielectric material. Alternatively, phase-change metal/alloy and dielectric layers 14 and 16 may be created using electron beam evaporation. Substrate 52 of FIG. 2 may be created in accordance with the methods described in application Ser. No. 09/652,975 entitled "Double-Sided Digital Optical Disk and Method and Apparatus for Making" filed Aug. 31, 2000.

Figure 3:
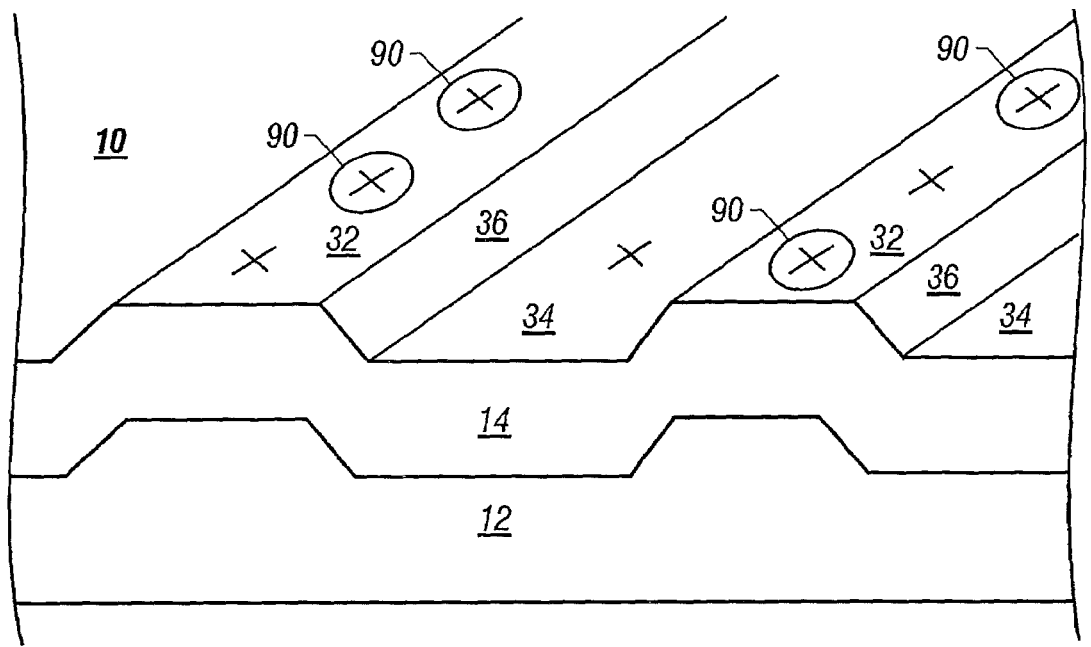
FIG. 3 is a perspective view of an optical data storage disk shown in FIG. 1.

FIG. 3 illustrates a prospective view of the optical data storage disk 10 having an optical data pattern formed thereon. For ease of illustration, dielectric layer 16 is not shown in FIG. 3. In FIG. 3, phase-change metal/alloy layer 14 is generally in the amorphous state. However, selected regions 90 on the raised surface portion 32 are crystallized in response to heating by a focused light beam. More particularly, the optical data storage disk 10 is rotated and the metal/alloy layer illuminated with a writing light beam (not shown) that is modulated in accordance with a stream of data signals. The writing light beam crystallizes selective regions of the phase-change metal/alloy 14 to produce the optical data pattern of crystalline regions 90 surrounded by amorphous regions. Similar optical data patterns may be formed on raised surface portions of phase-change layers 72 shown in FIG. 2.

It is noted that the present invention should not be limited to crystalline regions occurring only on the raised surface portions 32 of phase-change metal/alloy layer 14. Rather, an optical data pattern of crystalline regions 90 surrounded with amorphous regions may occur on only raised surface portions 32, on only recessed surface portions 34, or on both the raised and the recessed surface portions 32 and 34, respectively, of phase-change metal/alloy layer 14. For purposes of explanation, the present invention will be described with reference to optical data patterns formed on the raised surface portions 32 of the phase-change metal/alloy layer 14.

Figure 4:
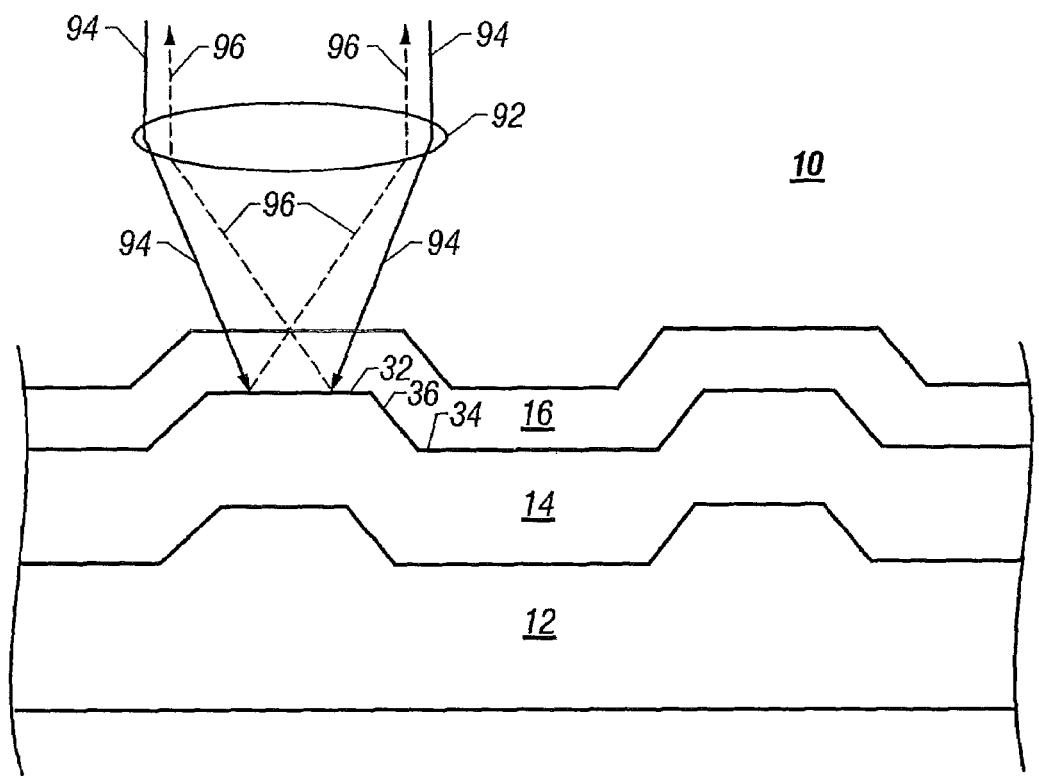
FIG. 4 illustrates operational aspects of reading optical data from the optical data storage disk shown in FIG. 1.

As noted above, the optical data pattern represented in FIG. 3 is created by exposing the phase-change metal/alloy layer of the optical data storage disk to a focused writing light beam that is modulated in accordance with a stream of data signals. FIG. 4 illustrates operational aspects of reading optical data from the phase-change metal/alloy layer. More particularly, FIG. 4 shows a cross-sectional view of the optical data storage disk 10 shown in FIG. 1. Further, FIG. 4 shows an objective lens 92, which receives laser incident light beam 94 and reflected light beam 96, reflected from raised surface portion 32. More particularly, objective lens 92 receives and focuses laser light 94 onto raised surface portion 32 as disk 10 rotates with respect to lens 92. Light 96 reflected from raised surface portion 32 passes back through objective lens 92 and is subsequently detected and converted into corresponding electrical signals by one or more detector elements (not shown). Generally, the reflectivity of phase-change metal/alloy layer 14 in the amorphous state is significantly different than the reflectivity of phase-change metal/alloy layer 14 in the crystalline state. In one embodiment, the reflectivity of the amorphous regions of phase-change metal/alloy layer 14 is greater than the crystalline regions of the phase-change metal/alloy layer 14. Accordingly, the characteristics of reflected light 96 depend upon whether the raised surface portion 32 that receives focused laser light 94 is in the amorphous or crystalline state.

Figure 6A:
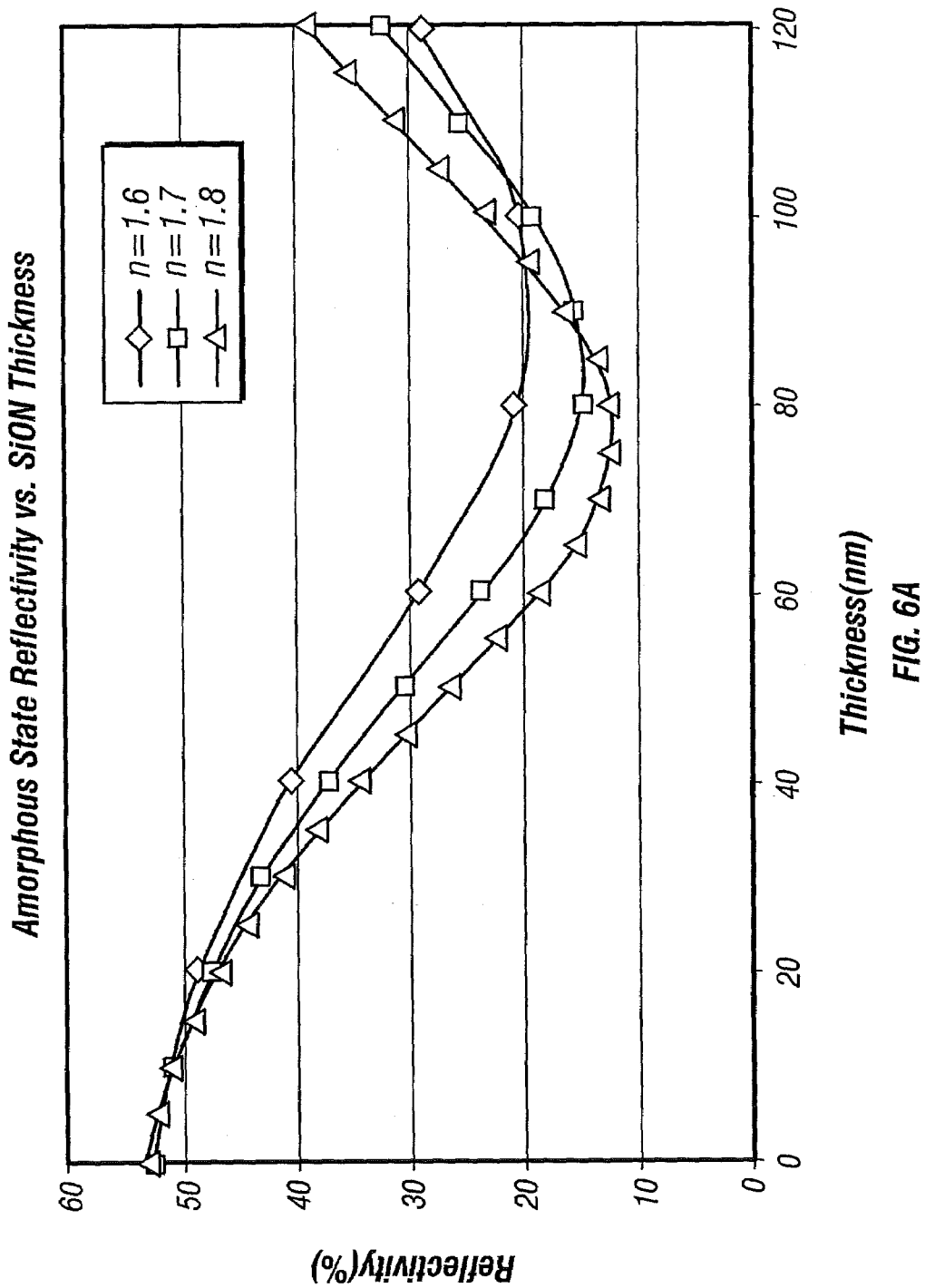
FIG. 6a is a graph illustrating reflectivity of the amorphous regions of the phase-change layer in the optical data storage disk shown in FIG. 1 as a function of dielectric layer thickness.
Figure 6B:
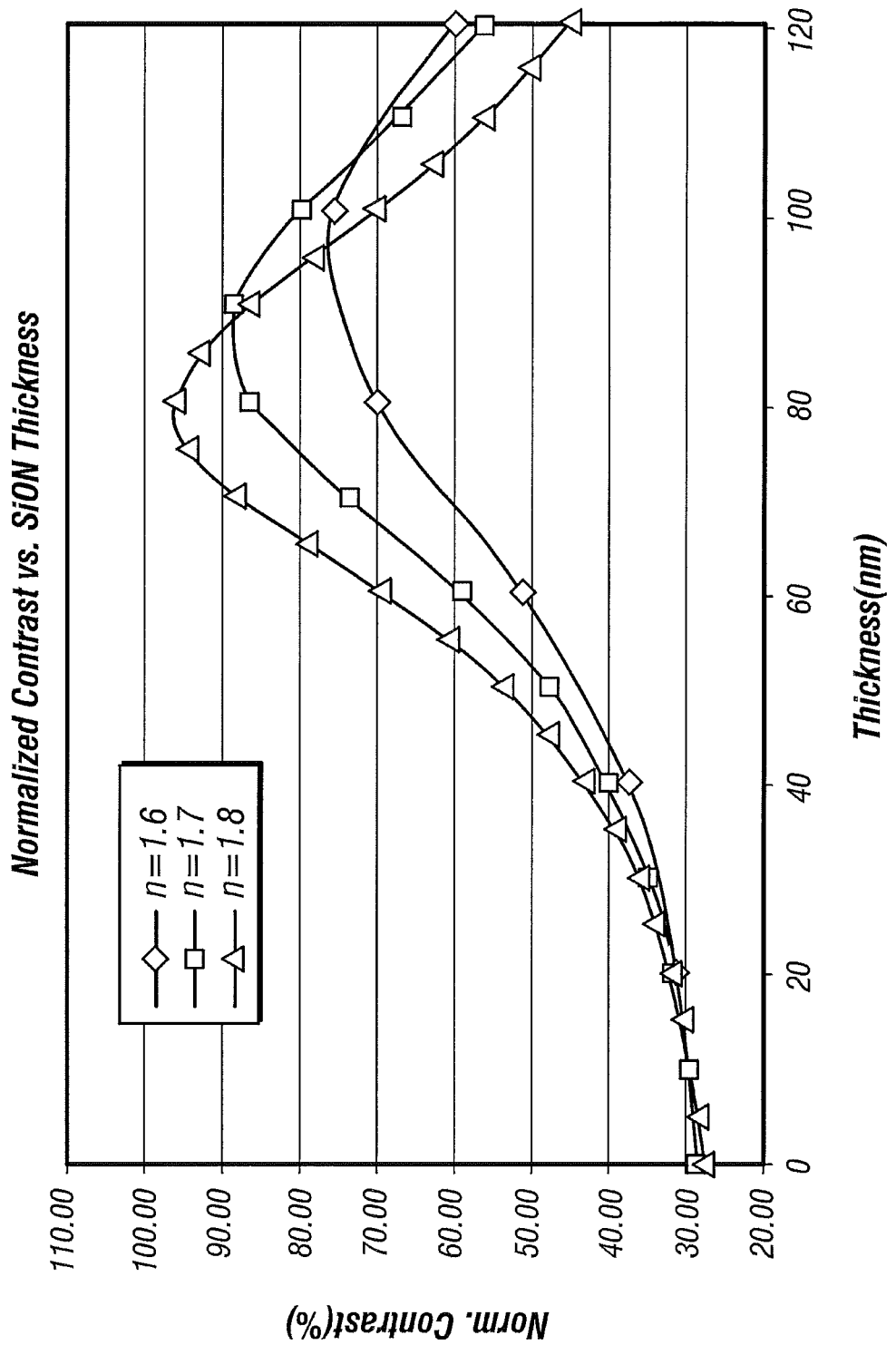
FIG. 6b is a graph illustrating normalized contrast for the phase-change layer of the optical data storage disk shown in FIG. 1 as a function of dielectric layer thickness.

Using silicon oxynitride in forming the dielectric layer 16 aids in creating optical data storage disks having substantially uniform optical characteristics as noted above. However, a benefit of using a silicon oxynitride dielectric relates to normalized contrast and carrier to noise ratio (CNR). FIG. 6a is a graph illustrating the reflectivity ($R_{amorphous}$) of $Sn_{15}Sb_{70}In_{15}$ in the amorphous state as a function of the dielectric thickness. More particularly, FIG. 6a plots $R_{amorphous}$ for a silicon oxynitride layer having an index of refraction n equal to 1.6, 1.7, or 1.8. FIG. 6b is a graph illustrating normalized contrast between $R_{amorphous}$ and reflectivity ($R_{crystalline}$) of $Sn_{15}Sb_{70}In_{15}$ in the crystalline state as a function of dielectric thickness. Normalized contrast NC is defined as:

$$NC=2(R_{crystalline}-R_{amorphous})/(R_{crystalline}+R_{amorphous}).$$

FIG. 6b shows that normalized contrast increases as the thickness of the silicon oxynitride dielectric layer 16 increases for a certain range of dielectric thicknesses.

Figure 6C:
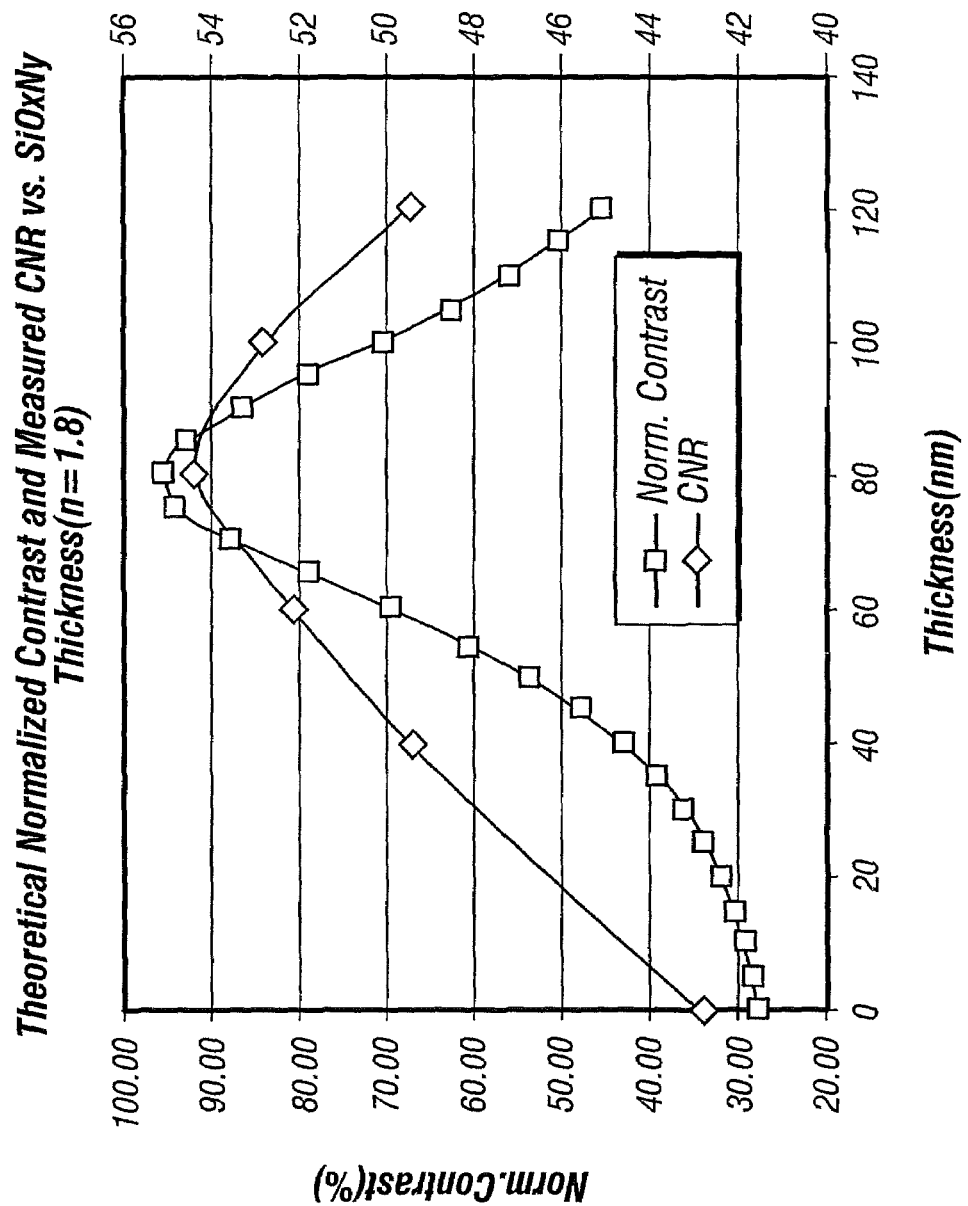
FIG. 6c is a graph illustrating CNR as a function of dielectric layer thickness.

CNR is a function of normalized contrast and noise. As shown in FIG. 6c, CNR increases as normalized contrast increases.

The previous discussion related to media performance in an idealized system, where limitations of the drive architecture were not taken into account. While the CNR performance shown in FIG. 6c is readily achievable with specialized test equipment, the low reflectivity associated with this large normalized contrast makes a storage disk with such parameters impractical for use in a commercial optical drive. In practice, the average intensity of reflected light 96 that carries data should be large enough to overcome noise produced by the electronics associated with generating and processing the electrical data signals of the detector element(s). Decreasing (or increasing) the thickness of the dielectric from that which gives the theoretical contrast maximum will increase the intensity of the reflected light 96, reducing the effects of electronic noise at the expense of contrast. For a practical system, the dielectric thickness must be chosen to balance these effects and optimize total system performance.

A silicon oxynitride dielectric with n equal to 1.7 and a thickness of 60 nm has been found to maximize CNR in an optical data storage disk system described in U.S. patent application Ser. No. 09/315,398 entitled "Removable Optical Storage Device and System" filed May 20, 1999, and incorporated herein by reference. A silicon oxynitride dielectric thickness of 60 nm maximizes CNR for a $Sb_{70}Sn_{15}In_5$ phase-change layer thickness of 85 nm on an optical data storage disk used in the system described in U.S. patent application Ser. No. 09/315,398. This presumes that the focused light beam having a wavelength of 630-670 nm. The thickness of the dielectric and phase-change layer may change for a focused light beam of other wavelengths. For example, a dielectric thickness of 60 nm and a phase-change layer thickness of 85 nm will also maximize the CNR for a light beam having a wavelength of 380-420 nm. The thickness of the phase-change layer and/or the dielectric layer to produce a maximized CNR may change upon change of any one or more of several variables including the chemical formula of the phase-change layer, the chemical formula of the dielectric, the wavelength of the light beam used to rewritable data, the electronic components used in processing signals produced by light detectors detecting light reflected from the optical data storage disk, etc. A phase-change layer thickness of 85 nm may be selected in consideration of optical and thermal factors. At 85 nm, absorption rate of light is increased which enhances or lowers the requirements for writing data to the phase-change layer. Stated differently, phase-change layer thickness of 85 nm enhances both reading and writing of optical data.

The normalized contrast between amorphous and crystalline states can also be altered based upon the content of the oxygen and nitrogen within the dielectric layer. Altering the content of the oxygen and nitrogen within this dielectric layer directly changes the index of refraction of the dielectric layer. With a dielectric layer of silicon dioxide and no nitrogen, the index of refraction is approximately 1.45. As noted above, it has proven difficult in practice to form the $SiO_x$ dielectric layer on the SbSnIn metal/alloy layer. With an index of refraction equal to 1.6 up to 2, where an index of refraction equal to 2 corresponds to dielectric of pure silicon nitride and no oxygen, contrast is tunable.

Figure 7:
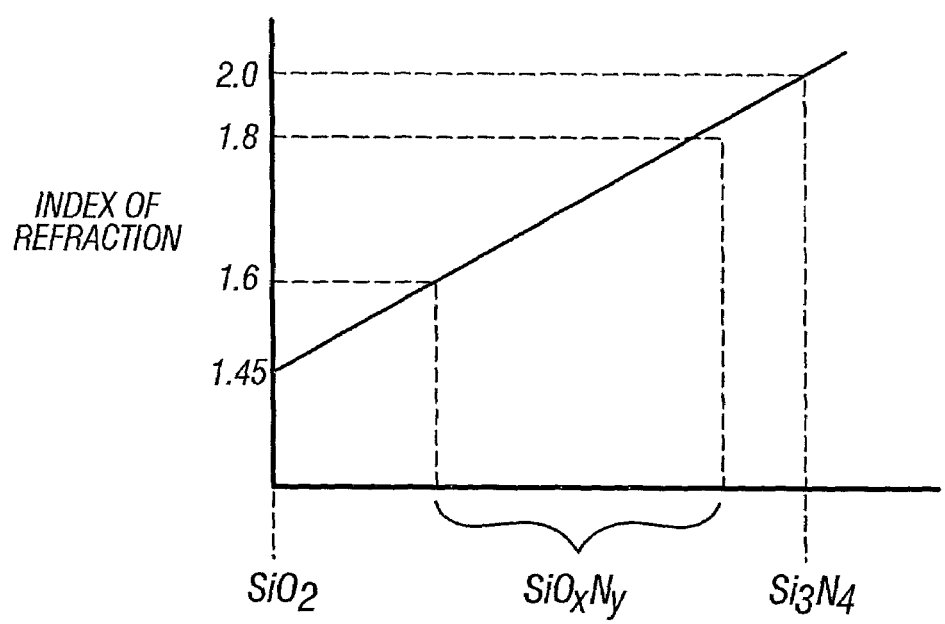
FIG. 7 is a graph illustrating the real part of the refractive index for the dielectric layer shown in FIG. 1 as a function of nitrogen content.

FIG. 7 is a graph illustrating the index of refraction n for dielectric layer 16 as a function of the nitrogen content thereof. It can be seen that the index of refraction varies linearly from a dielectric material that contains no nitrogen (i.e., $SiO_x$) to a dielectric material that contains no oxygen (i.e., SiN). Altering the content of the oxygen and nitrogen within the silicon oxynitride dielectric layer 16 can also increase the contrast between amorphous and crystalline states in the phase-change metal/alloy layer 14. Contrast varies as a secondary effect of a change of refractive index of the silicon oxynitride dielectric layer 16. In the preferred embodiment, the nitrogen and oxygen content of the silicon oxynitride is selected so that the real part of the index of refraction n is within the range of 1.45 to 2.0, ideally 1.7. For $SiO_xN_y$ at n=1.7, x is approximately 1.1, and y is approximately 0.6.

Although the present invention has been described in connection with several embodiments, the invention is not intended to be limited to the specific forms set forth herein. On the contrary, it is intended to cover such alternatives, modifications, and equivalents as can be reasonably included within the spirit and scope of the invention as defined by the appended claims.

What is claimed is:

1. A first-side optical storage medium comprising:
a flexible single substrate having first and second principal surfaces;
a phase-change layer overlying the first principal surface of the substrate, the first principal surface having a series of grooves and, said phase-change layer mimicking a shape of said grooves and lands; and,
an oxy-nitride optical coupling layer overlying the phase-change layer, the oxy-nitride optical coupling layer having a thickness and composition adapted to optically couple the phase-change layer to a laser beam incident on the optical coupling layer and to maximize contrast, and mimicking the shape of the phase-change layer and thus to the shape of the grooves and lands, wherein no further layers overlay the oxy-nitride optical coupling layer.

2. The first-side optical storage medium of claim 1 wherein said phase-change layer contains a writeable area.

3. The first-side optical storage medium of claim 1 wherein said phase-change layer comprises SbInSn.

* * * * *

UNITED STATES PATENT AND TRADEMARK OFFICE
CERTIFICATE OF CORRECTION

| | | |
|---|---|---|
| PATENT NO. | : 8,685,621 B2 | Page 1 of 1 |
| APPLICATION NO. | : 12/116161 | |
| DATED | : April 1, 2014 | |
| INVENTOR(S) | : Brian Medower, Ian Redmond and David Davies | |

It is certified that error appears in the above-identified patent and that said Letters Patent is hereby corrected as shown below:

In the Claims

In claim 1, column 8, line 49, the word "lands" has been omitted after the word "and". Claim 1 should be printed as follows:

1. A first-side optical storage medium comprising:
   a flexible single substrate having first and second principal surfaces;
   a phase-change layer overlying the first principal surface of the substrate, the first principal surface having a series of grooves and lands, said phase-change layer mimicking a shape of said grooves and lands; and,
   an oxy-nitride optical coupling layer overlying the phase-change layer, the oxy-nitride optical coupling layer having a thickness and composition adapted to optically couple the phase-change layer to a laser beam incident on the optical coupling layer to maximize contrast, and mimicking the shape of the phase-change layer and thus to the shape of the grooves and lands, wherein no further layers overlay the oxy-nitride optical coupling layer.

Signed and Sealed this
Tenth Day of June, 2014

Michelle K. Lee
*Deputy Director of the United States Patent and Trademark Office*